United States Patent
Shafer et al.

(10) Patent No.: US 6,211,272 B1
(45) Date of Patent: Apr. 3, 2001

(54) POLYBUTENE/LIQUID POLYDIENE HOT MELT ADHESIVE

(75) Inventors: David Lee Shafer; David Romme Hansen, both of Houston; Larry McArthur Kegley, League City; James Robert Erickson, Katy, all of TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/267,263

(22) Filed: Mar. 12, 1999

Related U.S. Application Data

(60) Provisional application No. 60/078,459, filed on Mar. 18, 1998.

(51) Int. Cl.⁷ .............................. C08J 3/00; C08K 3/20; C08L 53/00; C08L 9/00; C08L 47/00
(52) U.S. Cl. .................... 524/270; 524/505; 525/98; 525/314
(58) Field of Search ............... 525/314, 98; 524/505, 524/270

(56) References Cited

U.S. PATENT DOCUMENTS

| | | | |
|---|---|---|---|
| 4,568,713 | 2/1986 | Hansen et al. | 524/291 |
| 4,833,192 | 5/1989 | Lakshmanan et al. | 524/476 |
| 4,937,138 | 6/1990 | Mostert | 428/286 |
| 5,286,781 | * 2/1994 | Gotoh et al. | 524/505 |
| 5,393,843 | 2/1995 | Handlin, Jr. et al. | 525/332.8 |
| 5,719,226 | 2/1998 | Kegley | 524/505 |

* cited by examiner

Primary Examiner—Patrick D. Niland
(74) Attorney, Agent, or Firm—Donald F. Haas

(57) ABSTRACT

It has been surprisingly found that certain properties including adhesion strength to smooth surfaces may be improved by making hot melt adhesives from blends comprising a poly-1-butene polymer, a tackifier resin, and from 3 wt. % to 25 wt. % of a liquid or semi-liquid, hydrogenated or partially hydrogenated low molecular weight conjugated diene polymer prepared by anionic polymerization. Any one of the following three polymers can be used in the adhesive formulation of this invention: 1) a hydrogenated styrene isoprene diblock copolymer having a number average molecular weight from 4000 to 30,000, preferably 6000 to 15,000, a polystyrene content of 5 to 15 percent by weight, preferably 8 to 12 percent by weight, which is at least 75 percent hydrogenated, preferably at least 85 percent hydrogenated; or 2) a hydrogenated polydiene polymer which may have one diene block of either isoprene or butadiene or maybe a diblock polymer wherein one block is of isoprene and the other block is of butadiene, and wherein the polymer may have a terminal hydroxy group, and wherein the polymer has a number average molecular weight of 500 to 20,000, preferably 1000 to 10,000, and is at least 75 percent hydrogenated, preferably at least 85 percent hydrogenated; or 3) a polyisoprene homopolymer having a number average molecular weight of 15,000 to 40,000, preferably 20,000 to 30,000 which is at least 75 percent hydrogenated, preferably at least 85 percent hydrogenated.

7 Claims, No Drawings

POLYBUTENE/LIQUID POLYDIENE HOT MELT ADHESIVE

This application claims benefit of Provisional Appl. 06/078,459, filed Mar. 18, 1998.

FIELD OF THE INVENTION

This invention relates to poly-1-butene based blends useful as hot melt adhesives. Particularly, this invention relates to the use of polymeric blends containing poly-1-butene and liquid/semi-liquid hydrogenated polydiene polymers as hot melt adhesives capable of adhering to smooth substrates such as plastic-based or plastic-finished constructions, particularly high density polyethylene films.

BACKGROUND OF THE INVENTION

Hot melt adhesives have found extensive use in industry in bonding, joining or fabrication of various structures, including construction of structures from synthetic polymeric films, such as polyethylene, polypropylene, etc.; foil, including metal foil such as aluminum foil, wax-coated or wax-impregnated cellulosic structures; and various non-woven materials whose constituents are based on polyolefins, polyesters, polyamides and acrylic-type polymers.

The modern trend in the packaging and disposable article industry, for example, is to use more of the plastic-based or plastic-finished constructions, such as polyethylene or polypropylene based extrusion coated, spray coated, or laminated composite constructions. The change in various packaging and disposable laminate from fibrous substrates, such as fabrics and paper or paperboard, to plastics based on synthetic polymers also necessitates that the various adhesives chosen to hold the structures together be compatible with the materials of construction, since the altered surface chemistry of such materials may not be adhesion compatible with traditionally-available hot melt adhesives.

Hot melt adhesives based on homopolymers or copolymers of 1-butene (hereinafter "poly-1-butenes") are commonly used to bond fabrics or non-woven sheets to other porous or semi-porous substrates. Poly-1-butenes' polymorphic nature and unique crystallization half-life allow adhesives based on this polymer to flow and remain tacky long after they have cooled to room temperature and thus have relatively long open time. As used herein, adhesion open time is the maximum time at which adhesion (adhesion to itself or to a substrate) can take place for material after it is cooled from the melt to room temperature. Consequently, poly-1-butene based hot melt adhesives can be easily applied to cold substrates and will cold flow into porous substrates before the material undergoes further transition and densification.

On smooth substrates such as olefinic films and metals especially painted metals and coated metals, the surface is much different from those with porous substrates. As a result, poly-1-butene based hot melt adhesives do not adequately wet the smooth surfaces and tend to pop off or delaminate after the phase transition.

Disposable articles such as baby diapers, adult incontinence briefs, sanitary napkins, etc. typically use adhesives between the outer spun-bonded non-woven fabric, often made of polyolefins such as polypropylene, and the adsorbent core. Adhesives are also used between the absorbent core and the polyolefin liquid barrier, typically a polyolefin film such as a polyethylene film. These adhesives typically have hot melt (350° F.) viscosities of less than 10,000 cP and therefore can be applied by spray coating techniques.

Poly-1-butene adhesives have offered formulators unique opportunities in the market as the adhesive between the polypropylene fabric and the absorbent core.

However, poly-1-butene inherently does not adhere very well to smooth surfaces, which have less surface areas than fabrics, such as painted/coated metals and polyolefin films, especially those outer liquid barrier films made of polyolefins such as polyethylenes. Because of this, formulators and diaper manufacturers were not able to utilize poly-1-butene based adhesives to adhere outer liquid barrier films until Lakshmanan et al. (U.S. Pat. No. 4,833,192) added liquid polybutenes, copolymers of isobutylene and butenes, to poly-1-butene adhesives to enhance their adhesion to polyethylene film. The present invention provides poly-1-butene based hot melt adhesives with good adhesion to both polyolefin fabrics and smooth polyolefin films which are superior to those containing liquid polybutenes.

SUMMARY OF THE INVENTION

It has been surprisingly found that certain properties including adhesion strength to smooth surfaces may be improved by making hot melt adhesives from blends comprising a poly-1-butene polymer, a tackifier resin, and from 3 wt. % to 25 wt. % of a liquid or semi-liquid, hydrogenated or partially hydrogenated, low molecular weight conjugated diene polymer prepared by anionic polymerization. Any one of the following three polymers can be used in the adhesive formulation of this invention:

1) A hydrogenated styrene isoprene diblock copolymer having a molecular weight from 4000 to 30,000, preferably 6000 to 15,000, a polystyrene content of 5 to 15 percent by weight, preferably 8 to 12 percent by weight, which is at least 75 percent hydrogenated, preferably at least 85 percent hydrogenated.

2) A hydrogenated polydiene polymer which may have one diene block of either isoprene or butadiene or may be a diblock polymer wherein one block is of isoprene and the other block is of butadiene, and wherein the polymer may have a terminal hydroxy group. The polymer has a molecular weight of 500 to 20,000, preferably 1000 to 10,000, and is at least 75 percent hydrogenated, preferably at least 85 percent hydrogenated.

3) A polyisoprene homopolymer having a molecular weight of 15,000 to 40,000, preferably 20,000 to 30,000 which is at least 75 percent hydrogenated, preferably at least 85 percent hydrogenated.

DESCRIPTION OF THE EMBODIMENTS

While the present invention is described in connection with the preferred embodiments, it will be understood that it is not intended to limit the invention to those embodiments. On the contrary, it is intended to cover all alternatives, modifications, and equivalents as may be included within the spirit and scope of the invention as defined by the appended claims.

The present invention is directed to a composition suitable for making a hot melt comprising (i) from about 20 wt. %. to about 60 wt. %, specifically from about 30 wt. %. to about 55 wt. %, more specifically from about 34 wt. % to about 43 wt. % of poly-1-butene polymer; (ii) from about 3 wt. % to about 25 wt. %, specifically from about 5 wt. % to about 20 wt. %, more specifically from about 7 wt. % to about 16 wt. % of the liquid or semi-liquid, low molecular weight and/or low viscosity hydrogenated polydiene polymer; (iii) from about 30 wt. % to about 75 wt. %, specifically from about 35 wt. % to about 65 wt. %, more specifically from about 45 wt. % to about 55 wt. % of tackifier resin; and (iv) from about 0 to about 5 wt. %, specifically from about 0 wt. % to about 2 wt. %, more specifically from about 0 wt. % to about 1 wt. % of a stabilizer such as an antioxidant. As used herein, all the wt. % referred to for ingredients contained in blends are based on total weights of the blends and wt % is percent by weight.

The present adhesive blend has improved adhesion to smooth substrates such as polyolefin films, specifically polyethylene films, and metal surfaces especially painted or coated metal substrates. The specific liquid/semi-liquid polymers described herein exhibit good compatibility with poly-1-butene.

The term poly-1-butene polymer (polybutylene) used herein refers a homopolymer or copolymer containing more than 50 mole % butene-1 having a melt index of from about 0.05 to about 5,000, specifically from about 1 to about 4,000, and more specifically from about 20 to about 2,000 dg/min., as determined by ASTM D-1238 condition E, at 190° C. Butene-1 homopolymers and copolymers useful with the present invention are primarily linear chain molecules with regular and spatially ordered arrangements of ethyl side groups; the groups that result when butene-1 is polymerized across the 1,2 carbon double bond along an ethylene chain backbone (see for example U.S. Pat. No. 3,362,940 which is herein incorporated by reference). When cooled from a melt, the ethyl side groups initially align in a tetragonal crystalline phase form II transforms into a stable hexagonal spatial arrangement (form I) with subsequent development of improved physical properties.

As a specific embodiment of the present invention, the polybutylene referred to herein is a butene-1 polymer containing from 90%, preferably from 95%, and more preferably from 97%, by weight of stereospecific portions. These stereospecific portions can be either isotactic or syndiotactic. As an illustrative example, isotactic poly-1 butenes having a low molecular weight, e.g. less than about 280,000 as determined by solution viscosity in "Decalin" (decahydronaphthalene) may be used. A butene-1 polymer usable herein is either a butene-1 homopolymer or a copolymer or a terpolymer or blends of two or more of these. If a butene-1 copolymer is used, the non-butene comonomer content is from 1 to 50 mole %, specifically from 1 to 30 mole% of either ethylene, propylene, or an alpha olefin having from 5 to 8 carbon atoms. Butene-1 copolymers can comprise one or more of a variety of alpha-olefins, see for example the butene-1 copolymers taught in U.S. Pat. No. 3,362,940. Butene-1/ethylene copolymers with ethylene comonomer in the range of 0.5–20 mole percent are expected to be useful in the inventive hot melt adhesive as the ethylene comonomer lowers the glass transition temperature (Tg) of the amorphous phase and reduces both the crystallization rate and the ultimate level of crystallinity in the polymer. It is contemplated that 5 to 15 mole %, specifically 8 to 12 mole %, comonomer content is particularly useful. The poly-1-butenes can be modified to increase surface activity by reaction with, for example, maleic anhydride as described in U.S. Pat. No. 4,554,304 which is herein incorporated by reference.

Suitable poly-1-butenes can be obtained in accordance with polymerization of butene-1 with catalysts of halides of Groups IV–VI metals, e.g. titanium, vanadium, chromium, zirconium, molybdenum and tungsten, etc., and cocatalysts of metal alkyl compounds, specifically, Ziegler-Natta catalysts of titanium halides or vanadium halides with aluminum halides or aluminum alkyl (halides) compounds. As a specific examples, the poly-1-butene can be obtained by a low-pressure polymerization of butene-1, e.g. by polymerizing butene-1 with catalysts of $TiCl_3$ or $TiCl_3$—$AlCl_3$ and $Al(C_2H_5)_2Cl$ at temperatures of 10 to 100° C., preferably 20–40° C., or $TiCl_3$—$AlCl_3$ and $Al(C_2H_5)_2Cl$ at temperatures of 10 to 100° C., preferably 20 to 40° C., e.g. according to the process described in DE-A-1,570,353 or U.S. Pat. No. 3,197,452 which are herein incorporated by reference. High melt indices are obtainable by further processing the polymer by peroxide cracking, thermal treatment or irradiation to induce scissions leading to a higher melt flow material.

Suitable poly-1-butenes can also be obtained using a high activity Ziegler-Natta catalyst of magnesium supported $TiCl_4$, with organoaluminum or $AlCl_3$ cocatalyst. They can be polymerized by a gas phase, liquid phase, suspension, solution phase, or slurry polymerization process.

Polybutylene DP0400, DP0800, DP8910PC, and DP8510, which are poly-1-butene polymers produced by Shell Chemical Company, of Houston, Tex., are suitable polymers, particularly the latter two. These polymers are copolymers of butene-1 with ethylene. The typical properties of these polymers are listed in the table below.

| Typical Physical Properties | DP0400 | DP8510 | DP8910PC | DP0800 |
|---|---|---|---|---|
| Melt Index dg/10 min | 20 | 45 | >500 | 200 |
| Brookfield viscosity CPS at 350° F. | – | – | 6–10 | 80–85 |
| Density, g/cm$^3$ | 0.915 | 0.895 | 0.895 | 0.945 |
| Hardness, Shore A scale | 55[1] | 25 | 20 | 90 |
| Melting point (° C.) | 125 | 90 | 90 | 125 |
| Glass transition temperature (° C.) | – | −34 | −34 | −18 |
| Crystallinity | – | 34 | 34 | 50 |
| Softening point, Ring and Ball (° C.) | – | 106 | 98 | 116 |

[1]for DP0400, the scale Is Shore D.

Since, within the scope of the invention, modified or non-modified butene-1 homopolymers and modified or non-modified butene-1 copolymers are contemplated, it should be noted that modified or non-modified butene-1 copolymers as the butene-1 component are most preferred over butene-1 homopolymers for use within the scope of the present invention. The present invention has been developed to provide a butene-1 based adhesive with open time that is adjustable and controllable based on the amount and type of nucleating agent and tackifying resin blended with the butene-1 component.

The liquid/semi-liquid polymers used herein are low viscosity polymers which are compatible with poly-1-butene used. The polymers used herein are viscous liquids at room temperatures and flow readily at 70° C. and 80° C. The liquid/semi-liquid polymers become elastic after being chemically crosslinked, e.g. vulcanized. As a first specific aspect of the present invention, the liquid/semi-liquid polymers used herein are conjugated diene polymers prepared by an anionic polymerization process as described below. As the second specific aspect of the present invention, the polymers are conjugated diene block copolymers. As the third specific aspect of the present invention, the polymers are diene copolymers with either zero styrene (or vinyl aromatic hydrocarbon) content or up to 25 mole %, specifically up to 15 mole %, more specifically up to 11 mole % of styrene (or vinyl aromatic hydrocarbon). As a preferred embodiment of the present invention, the polymer used contains substantially no styrene. As the fourth specific aspect of the present invention, the polydienes are hydrogenated or partially hydrogenated. The liquid/semi-liquid polymer used herein contains up to 25% unsaturation (i.e., the % of the double bonds left after the hydrogenation process), specifically up to 15% unsaturation, more specifically up to 1% unsaturation, and still more specifically up to 0.5% unsaturation. As the fifth specific aspect of the present invention, the molecular weights are from 2,000 to 40,000. The molecular weights used herein are number average molecular weights, unless specified otherwise. As the sixth specific aspect of the present invention, the viscosity of the liquid/semi-liquid polymer is generally from about 1,000 to about 10,000,000, specifically from about 10,000 to about 500,000, and more specifically from about 20,000 to about 50,000 centipoises at room temperature as measured by a Bohlin Rheometer done in parallel phase; and from about 10 to about 100,000, specifically from about 100 to about 50,000, and more specifically from about 500 to about 20,000 centipoises at 80° C. As a seventh specific aspect of the present invention, the glass transition temperatures Tg(° C.) of the suitable liquid/semi-liquid polymers are generally less than about −30° C., specifically less than about −40° C., and more specifically less than about −50° C. measured by Diffraction Scanning Calorimetry (DSC) second heating mid point method of 10° C. per minute.

The first type of polymer which can be used in the adhesives of the present invention is a hydrogenated styrene isoprene diblock copolymer having a molecular weight from 4000 to 30,000, preferably 6000 to 15,000, a polystyrene content of 5 to 15 percent by weight, preferably 8 to 12 percent by weight, which is at least 75 percent hydrogenated, preferably at least 85 percent hydrogenated.

The second type of polymer which can be used in the present invention is a hydrogenated polydiene polymer which may have one diene block of either isoprene or butadiene or may be a diblock polymer wherein one block is of isoprene and the other block is of butadiene, and, optionally, wherein the polymer may have a terminal hydroxy group. The polymer has a molecular weight of 500 to 20,000, preferably 1000 to 10,000, and is at least 75 percent hydrogenated, preferably at least 85 percent hydrogenated. A preferred polydiene polymer for use in the present invention has the structural formula $(HO)_x$—A—$S_z$—B—$(OH)_y$ wherein A and B are polymer blocks which may be hompolymer blocks of conjugated diolefin monomers, copolymer blocks of conjugated diolefin monomers, or copolymer blocks of diolefin monomers and monoalkenyl aromatic hydrocarbon monomers. These polymers may contain up to 60 percent by weight of at least one vinyl aromatic hydrocarbon, preferably styrene. Generally, it is preferred that the A blocks should have a higher concentration of more highly substituted aliphatic double bonds than the B blocks have. Thus the A blocks have a greater concentration of di-, tri-, or tetra-substituted unsaturation sites (aliphatic double bonds) per unit of block mass than do the B blocks. The A blocks have a number average molecular weight of 100 to 6,000, preferably 500 to 4,000, and most preferably 1,000 to 3,000, and the B blocks have a number average molecular weight of 1,000 to 15,000, preferably 2,000 to 10,000, and most preferably 3,000 to 6,000. S is a vinyl aromatic hydrocarbon block which may have a number average molecular weight of from 100 to 10,000. x and y are 0 or 1. Either x or y may be 1, but only one at a time can be 1. z is 0 or 1.

The most highly preferred polymers for use herein are diblock copolymers which fall within the scope of the above formula. The overall number average molecular weight of such diblocks may range from 1,500 to 15,000, preferably 3,000 to 7,000. Preferably, the diblock has the structure:

I—EB—OH where I represents isoprene and EB represents hydrogenated butadiene.

The third type of polymer is a polyisoprene homopolymer having a molecular weight of 15,000 to 40,000, preferably 20,000 to 30,000 which is at least 75 percent hydrogenated, preferably at least 85 percent hydrogenated.

In general, the liquid/semi-liquid hydrogenated polydiene polymers used in this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula:

RLi wherein R is an aliphatic, cycloaliphatic, alkyl-substituted cycloaliphatic, aromatic or alkyl-substituted aromatic hydrocarbon radical having from 1 to 20 carbon atoms.

Conjugated dienes which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like.

Stabilizers usable within the scope of the present invention can be hindered phenols, such as Irganox 1010, made by Ciba Geigy Corporation, Ethanox 330 made by Ethyl Corporation, or phosphorus-based stabilizers such as Irgafos 168 made by Ciba Geigy Corp. Irganox 1010 is the most preferred stabilizer for use in this invention. The quantity of stabilizer usable within the scope of the present invention is expressed in parts by weight (pbw) based on the total amount of the components in the hot melt adhesive which are expressed in weight percent. Ethanox 330 is a 1,3,5-trimethyl-2,4,6-tris [3,5-di-tert-butyl-=4-hydroxy-benzyl] benzene. Irganox 1010 is usually referred to as tetrakis [methylene (3,5-di-tert-butyl-4-hydroxyhydrocinnamate)] methane. It is preferred to use about 0.3 pbw of a stabilizer, although about 0.1 to about 2 pbw is also usable within the scope of the invention.

Tackifying resins usable within the scope of the present invention can be selected from the group of non-polar tackifying resins, such as Regalrez 1085 (a hydrogenated hydrocarbon resin) and Regalite Resins such as Regalite R91 available from Hercules, Escorez 1304 (also a hydrocarbon resins) and Escorez 1102 available from Exxon Chemical Company, Wingtack 95 (a synthetic polyterpene resin), or Wingtack 85, all available from Goodyear Tire and Rubber are usable herein. Within the scope of the present invention, these resins can include: partially or completely hydrogenated $C_9$- or $C_5$-based hydrocarbon resins, including but not limited to cyclopentadine resins, polyterpene resins aromatic $C_5$ resins with softening points in the range of 70° C. to 125° C. Tackifying resins usable within the scope of this invention can include polar tackifying resins. The choice of available polar tackifying resins for use within this formulation is limited since many of the polar resins are not, at least partially, compatible with the butene-1 homopolymer and copolymers. For example, Zonester 85, available from Arizona Chemical Company, is a polar tackifying resin usable herein. Tackifying resins to be used within the scope of the present invention can be about 30 to 75 wt % based on the total composition, preferably 35 to 65% by weight of the total composition, and more preferably 45 to 55 % by weight of the total adhesive formulation.

Optionally, the blends of the present invention may also contain nucleating agents such as isotactic polypropylene, polyethylene, polyethylene-based waxes, fatty acid amides, amides, anthraquinones, and graphitic non-turbostratic carbon. Other nucleating agents are also contemplated for use in this invention. Graphitic non-turbostratic carbon nucleating agents are disclosed in copending application Ser. No. 183,689 filed Sep. 4, 1981 now U.S. Pat. No. 4,321,334 (having common assignee). Fatty acid amine nucleating agents are disclosed in copending application Ser. No. 216,055 filed Dec. 15, 1980, now U.S. Pat. No. 4,322,503 (having common assignee). These fatty acid amides include specifically N,N-ethylene-bis-stearamide and stearamide. Anthraquinone nucleating agents are disclosed in copending patent application Ser. No. 218,665 field Dec. 22, 1980, now abandoned (having common assignee). Specific anthraquinones include 1,2-dihydroxy-9,10-anthraquinone; 1,4-dihydroxy-9,10 anthraquinone; 1,5-dihydroxy-9,10-anthraquinone; 12,5,8-tetrahydroxy-9,10-anthraquinone; 9,10-anthraquinone; and sodium 2-anthraquinone sulfonate. Amide nucleating agents are disclosed in copending application Ser. No. 214,148 filed Dec. 8, 1980, now U.S. Pat. No. 4,320,209 (having common assignee). Preferred amides include 1-naphthalene acetamide; N-stearoyl-p-aminophenol; mercapto-n-2-naphthylacetamide; malonamide; nicotinamide; isonicotinamide; benzamide; phthalimide; salicylamide; anthranilamide; and 1,8-naphthalimide.

Optionally, the present adhesive compositions may also contain fillers, oils, plasticizers, amorphous poly-alpha-olefins, waxes, etc. can be utilized in combination with the above formulations.

A preferred blend of the present invention uses about 34 to 43 wt % of a butene-1 polymer having a melt index equal to or greater than 40 dg/min. (ASTM 1238 condition E) such as DP8910PC available from Shell Chemical Company; 7 to 16 wt. % of hydrogenated or partially hydrogenated conjugated polydiene (block) polymer or partially hydrogenated isoprene-butadiene block copolymer with M.W. of about 6,000 available form Shell Chemical Company; 45 to 55 wt. % of a tackifier, and 0 to 1 wt. % antioxidant, based on the total composition.

The term ethylene polymer refers to any polyethylene homopolymer or any ethylene and other olefin copolymer made by a conventional Ziegler-Natta Catalyst of Group IV–VI transition metal. Specifically the ethylene polymer is made by a vanadium metal compound, a zirconium metal compound or a titanium halide ($TiCl_4$ or $TiCl_3$), optionally supported by magnesium halide, with an aluminum trichloride or alkyl aluminum (halides) cocatalyst.

Blending of the components can occur by melt compounding techniques. The method of combining the ingredients of the formulation is important. For example, in most cases, it is desirable to use the least amount of energy to merge the components into an effective blend. Therefore, the preferred method of blending is to first melt the poly-1-butene, and then add the liquid/semi-liquid polymer, and then add the tackifier, anti-oxidant and any other fillers, additives or modifiers..

The invention will be illustrated by the following illustrative embodiments which are provided for illustration purpose only and are not intended to limit the scope of the instant invention.

ILLUSTRATIVE EMBODIMENTS

I.Illustrative Embodiment I

I.A. Preparation of Adhesive Blends

In the Illustrative and Comparative Embodiments below, poly-1-butene copolymer DP8910PC (a butene-1 and ethylene copolymer having about 5.5% by weight of ethylene, available from Shell Chemical Company, Houston, Tex.) was first added to the mixing head of a small sigma blade mixer and mixed for 45 minutes until smooth. A low viscosity, Liquid or semi-liquid elastomer was then added and mixed for 15 minutes. Thereafter, ESCOREZ 1102, a $C_5$ type solid tackifying resin (available from Exxon Chemical Company) and IRGANOX 1010, a phenolic antioxidant antioxidant (available from Ciba Geigy) were added and mixed for an additional 20 minutes. During the preparation process, the mixing temperature was approximately 360° F. degrees, and the mixing speed was 60 rpm. A 10 cfm nitrogen purge was used in the mixing head. The following low viscosity, Liquid or semi-liquid elastomeric polymer were used in the formulations:

Elastomer S is a styrene-isoprene diblock copolymer having a molecular weight of approximately 30,000. It is available from Shell Chemical Company, Houston, Tex. The description of the elastomer can be found in U.S. Pat. No. 5,719,226, which is herein incorporated by reference.

Polymer-R3, a 40,000 molecular weight isoprene-butadiene block polymer (available from Kuraray). The glass transition temperature is about −95° C., the specific gravity is 0.88 g/c, and the melt viscosity at 38° C. is about 3,200 (poise).

Polymer-R2, a 25,000 number average molecular weight hydrogenated isoprene (ethylene/propylene) polymer (available from Kuraray). The iodine value is about 40. The glass transition temperature is about −59° C. The specific gravity is about 0.86 g/cc and the melt viscosity at 38° C. is about 10,000 (poise).

E1060, an amorphous polypropylene polymer (Eastman Chemicals).

ISOLENE 40, a 40,000 molecular weight liquid isoprene polymer (available from Hardman, Inc.).

Polymer-P, a 10,000 number average molecular weight 10% polystyrene content hydrogenated styrene-isoprene (styrene-ethylene/propylene) diblock copolymer.

Polymer-L, a 6,000 number average molecular weight partially hydrogenated isoprene-butadiene block polymer containing a primary hydroxyl functionality on one end of the polymer and polyisoprene on the other end. The double bond equivalent weight is about 590. The glass transition temperature is about −60° C. The neat viscosity at 75° C. is about 2100 cPs The specific gravity is about 0.89 g/cc. The styrene content is zero. The polyisoprene block molecular weight is 2000.

The formulations on weight basis are shown in Table 1 below.

TABLE 1

Adhesive Blends Formulations

| Formulation | 1 | 2 | 3 | 4 | 5 | 6 | 7 | 8 |
|---|---|---|---|---|---|---|---|---|
| PB8910PC | 50 | 35 | 35 | 35 | 35 | 35 | 35 | 35 |
| Polymer-S | | 15 | | | | | | |
| Polymer-R3 | | | 15 | | | | | |
| Polymer-R2 | | | | 15 | | | | |
| E1060 | | | | | 15 | | | |
| ISOLENE 40 | | | | | | 15 | | |
| Polymer-P | | | | | | | 15 | |
| Polymer L | | | | | | | | 15 |
| ESCOREZ 1102 | 50 | 50 | 50 | 50 | 50 | 50 | 50 | 50 |
| IRGANOX 1010 | 1 | 1 | 1 | 1 | 1 | 1 | 1 | 1 |

I.B. Determination of Compatibility

During the afore-mentioned mixing process, the compatibility between the poly-1-butene polymers and the liquid/semi-liquid, low viscosity polymer(s) was determined. Following the addition of the liquid/semi-liquid elastomer, the mixture was observed to determine if the combination of polybutylene and liquid polymer was opaque (which indicates that poly-1-butene and the liquid or low viscosity polymer are incompatible with each other)or clear (which indicates the two polymers are compatible). Table 2 qualitatively analyzes the compatibility of the two ingredients.

TABLE 2

Modifier Compatibility and Failure Mechanisms

| | Formulation | Compatibility | Peel Adhesion |
|---|---|---|---|
| PB Control | 1 | + | − |
| Polymer-S | 2 | − | − |
| Polymer-R3 | 3 | − | − |
| Polymer-R2 | 4 | + | + |
| E1060 | 5 | − | erratic |
| ISOLENE 40 | 6 | − | + |
| Polymer-P | 7 | + | + |
| Polymer-L | 8 | + | + |

+ denotes good compatibility, peel adhesion
− denotes poor compatibility, peel adhesion I.C. Spray Coating Adhesion Study Following mixing, the adhesives were spray coated at various temperatures using a PAM 600 Spraymatic melt coater gun onto a sheet of 1.4 mil polyethylene diaper film supplied by 3M. Following coating, the film was folded together, laminated, and rolled down with a 4.5 pound rubber coated roller. The adhesive laminates were aged at room temperature for 5 days. Strips of about one inch wide were cut from the laminated film, and the peel adhesion was observed by pulling the strips apart by hand. Table 2 also shows a qualitative analysis of the peel adhesion failure mechanism observed.

I.D. Conclusion—Illustrative Embodiment I

As seen in Table 2, hydrogenated or partially hydrogenated liquid elastomers tended to be the most compatible with polybutylene in the melt. Adhesives which included Polymer-R2 (EP), Polymer-P (S-EP), or Polymer-L (I-EB) were found to produce transparent, water-clear blends with polybutylene before the tackifying resin was added. Adhesives which contained Polymer-S (S-I), E1060 (APE), and ISOLENE 40 (I) were all milky mixtures in the melt. It should be noted that the milky nature of the Polymer-S, E1060, and ISOLENE 40 based adhesives became more translucent after the solid tackifying resin was added. The tackifier seems to act as a compatibilizer between these systems and polybutylene.

Failure mechanisms of the coated hot melt adhesives to polyethylene films were examined, and the results are also shown in Table 2. The control material, based only on polybutylene and tackifying resin, peeled quite easily with an adhesive failure. The adhesives based on Polymer-S (S-I) and Polymer-R3 (I-B) also failed in a similar manner. The adhesives based on E1060 (APP) produced very erratic results. Some samples failed adhesively while some produced a polytear (substrate failure). The adhesives based on the hydrogenated or partially hydrogenated materials (Polymer-R2, Polymer-P, and Polymer-L) appeared to adequately wet out the polyethylene film surfaces when coated, producing substrate failures (polytear) when peeled.

II. Illustrative Embodiment II

II.A. Preparation of Adhesive Blends

Large scale batches (32 pounds) of four adhesive formulations were prepared on a 1 gallon sigma blade mixer. The formulations were very similar to those used in the Illustrative Embodiment I. Instead of using a $C_5$ based tackifier, a hydrogenated $C_9$ (REGALITE R91) tackifying resin from Hercules Resins was used.

The mixing temperatures were approximately 360 to 380° F. A 10 cfm nitrogen purge was used in the mixing head at all times to minimize degradation. The polybutylene was first added to the mixing head and mixed for 45 minutes until smooth. Subsequently, liquid polymer was added and mixed for 15 minutes. Thereafter, solid tackifying resin and antioxidant were added and mixed an additional 20 minutes. The formulations are shown in Table 3.

II.B. Spray Coating Adhesion Study

The adhesives were spray coated on a melt blown adhesive coating line. The adhesives were melted on a DM-90 Gridmelter at 330 to 360° F. Process air was heated to 380° F. at 55 psi using a DH-15 compressor/heater. S.S.T. die tips (orifice diameter—0.020 inches) melt sprayed a 5.25 inch wide intermingled melt pattern on a 6 inch wide polyethylene film (2 mil) moving at 300 feet/minute. The forming distance was 2 inches. The coated film was laminated with a second 6 inch wide film with a nip pressure of 50 psi. The melt pump speed was controlled to lay down adhesive add on weights of 10, 5, 2.5, 1.25, and 0.625 grams adhesive/square meter.

The coated film laminates were tested one week after coating. A T-peel test on a 1 inch strip was used to quantify the actual peel values obtained. The crosshead speed was 10 inches/minute. At least five specimens for each formulation/coating weight were averaged.

TABLE 3

| | Formulations | | | |
|---|---|---|---|---|
| Formulation | A | B | C | D |
| PB8910PC | 50 | 35 | 35 | 35 |
| Polymer-R2 | | 15 | | |

TABLE 3-continued

| | Formulations | | | |
|---|---|---|---|---|
| Formulation | A | B | C | D |
| Polymer-P | | | 15 | |
| Polymer-L | | | | 15 |
| REGALITE R91 | 50 | 50 | 50 | 50 |
| Irganox 1010 | 1 | 1 | 1 | 1 |

II.C. Conclusion—Illustrative Embodiment II

Table 4 shows the average and initial peel force for all 19 samples produced and provides the processing information regarding the 19 samples.

Note that the control samples based on polybutylene and tackifier (samples A1, A2, and A3) had very low peel values at several coating weights. The addition of the liquid block polymers (samples B4–D19) improves the peel values of the adhesives.

It is to be noted that Samples B7 and C8 were coated at 10 grams adhesive/square meter. The large amount of adhesive appeared to have melted and fused the substrates together, producing a polytear.

The data is broken out by coating weight and compared in Table 4. In all cases, Polymer-R2 (EP) and Polymer-L (I-EB) outperform the Polymer-P sample and the control. At lower coating weights, the Polymer-L provides excellent balance of initial and average peel—it works best at low coat weights and thus should be best for commercial application.

Table 4 shows the effect of coating weight on the peel values obtained. Note that although the peel value decreases as a function of coating weight, very respectful peel values can be obtained at very low coating weights using Polymer-L as a modifier of polybutylene.

TABLE 4

Description of Film Samples

| Film Sample ID | Adhesive ID | Adhesive Coating Weight (g/sq m) | Initial Peel (g) | Average Peel (g) | Comments |
|---|---|---|---|---|---|
| A1 | A | 5 | 15.72 | 8.466 | |
| A2 | A | 2.5 | 6.577 | 5.887 | |
| A3 | A | 1.25 | 6.907 | 5.558 | |
| B4 | B | 5 | 245.3 | 125.2 | |
| B5 | B | 2.5 | 175.8 | 56.5 | |
| B6 | B | 1.2 | 60.47 | 44.81 | |
| B7 | B | 10 | 696.9 | 734.9 | polytear |
| C8 | C | 10 | 482.9 | 297.4 | polytear |
| C9 | C | 5 | 121.6 | 69.52 | |
| C10 | C | 2.5 | 47.68 | 37.57 | |
| C11 | C | 1.25 | 37.96 | 26.06 | |
| C12 | C | 1.25 | 34.56 | 25.9 | * |
| C13 | C | 1.25 | 44.83 | 28.41 | *, ** |
| C14 | C | 0.625 | 28.76 | 14.96 | *, **, |
| D15 | D | 10 | 372.8 | 194.5 | |
| D16 | D | 5 | 236 | 159.2 | |
| D17 | D | 2.5 | 247.7 | 114.4 | |
| D18 | D | 1.25 | 191.9 | 90.9 | |
| D19 | D | 0.625 | 145.1 | 69.7 | *, **, |

* denotes increase process temperature by 20° F. in all zones.
** denotes reduced forming distance to 1.5 inches.
*** denotes increased line speed to 600 feet/minute.

III. Illustrative Embodiment III—Comparison with Adhesives Containing PIB

III.A. Preparation of Adhesive Blends

Four hot melt adhesive formulations were prepared. Mixing temperatures were approximately 360 to 380° F. A 10 cfm nitrogen purge was used in the mixing head at all times to minimize degradation. The polybutylene was first added to the mixing head and mixed for 45 minutes until smooth. Following, liquid polymer was added and mixed for 15 minutes. Following, solid tackifying resin and antioxidant were added and mixed an additional 20 minutes. The formulations are shown in Table 5.

TABLE 5

Adhesive Formulations

| Formulation ID | D | E | F | G |
|---|---|---|---|---|
| DP8910PC | 35 | 35 | 42.5 | 42.5 |
| Polymer-L | 15 | | 7.5 | |
| Exxon PIB 2200 (Comparative) | | 15 | | 7.5 |
| Regalite R91 | 50 | 50 | 50 | 50 |
| Irganox 1010 | 1 | 1 | 1 | 1 |

III.B. Spray Coating Adhesion Test

The adhesives were spray coated on a melt blown adhesive coating line. The adhesives were melted on a DM-90 Gridmelter at 330 to 360° F. Process air was heated to 380° F. at 55 psi using a DH-15 compressor/heater. S.S.T. die tips (orifice diameter—0.020 inches) melt sprayed a 5.25 inch wide intermingled melt pattern on a 6 inch wide polyethylene film (2 mil) moving at 300 feet/minute. The forming distance was 2 inches. The coated film was laminated with a second 6 inch wide film with a nip pressure of 50 psi. The melt pump speed was controlled to lay down adhesive add on weights of 10, 5, 2.5, 1.25, and 0.625 grams adhesive/square meter. Adhesive coating information can be found in Table 6

The coated film laminates were tested one week after coating. A T-peel test on a 1 inch strip was used to quantify the actual peel values obtained. The crosshead speed was 10 inches/minute. At least five specimens for each formulation/coating weight were averaged. Load at Initial Point and Average Load for each formulation/coating weight can also be found in Table 6.

TABLE 6

Description of Film Samples and Peel Values

| Film Sample ID | Adhesive ID | Adhesive Coating Weight (g/sq m) | Initial Peel (g) | Average Peel (g) | Comments |
|---|---|---|---|---|---|
| E20 | E | 10 | 45.15 | 24.08 | |
| E21 | E | 5 | 29.96 | 16.25 | |
| E22 | E | 2.5 | 16.87 | 10.39 | |
| E23 | E | 1.25 | 27.88 | 10.06 | |
| E24 | E | 0.625 | 14.9 | 6.857 | * |
| D25 | D | 10 | 373.4 | 165.6 | PT |
| D25 | D | 5 | 323.9 | 112 | PT |
| D27 | D | 2.5 | 228.8 | 81.47 | PT |
| D28 | D | 1.25 | 166.4 | 74.93 | PT |
| D29 | D | 0.625 | 118 | 49.17 | PT, * |
| F30 | F | 10 | 269.5 | 57.65 | PT |
| F31 | F | 5 | 138.5 | 48.37 | PT |
| F32 | F | 2.5 | 147 | 33.41 | |
| F33 | F | 1.25 | 81.52 | 31.33 | |
| F34 | F | 0.625 | 37.13 | 18.71 | * |
| G35 | G | 10 | 242.1 | 35.79 | |
| G36 | G | 5 | 135.1 | 25.18 | |

TABLE 6-continued

Description of Film Samples and Peel Values

| Film Sample ID | Adhesive ID | Adhesive Coating Weight (g/sq m) | Initial Peel (g) | Average Peel (g) | Comments |
|---|---|---|---|---|---|
| G37 | G | 2.5 | 49.95 | 25.48 | |
| G38 | G | 1.25 | 74.13 | 23.14 | |
| G39 | G | 0.625 | 20.91 | 13.31 | * |

PT denotes polytear during testing
* denotes that the melt process temperature was increased 20° F. in all zones, Forming distance reduced to 1.5 inches, and line speed increased to 600 f/min.

III.C. Conclusion of Illustrative Embodiment III.

It can be seen by looking at the data in Table 6 that in every case the formulation containing polymer L outperformed the comparative containing PIB 2200 polymer. For the systems containing only 7.5 percent of the modifying polymer (F and G), the improvements provided by polymer A are substantial except that at an adhesive coating weight of 5 grams/square meter wherein the polymer of the invention provides only an advantage of 138.5 in intial peel to 135.1 for the PIB polymer (however, the average peel difference is 48.37 to 25.18). When 15 percent modifier is added (D and E), the performance advantages of polymer L are dramatically illustrated. The initial and average peel values at all coating weights are considerably greater for polymer L than for PIB 2200. When polymer L is used, higher peel values can be obtained when more modifier is added but this is not the case when the PIE 2200 is used as a modifier. When more PIB is added to the system, the peel adhesion decreases. Thus, it can be seen that the adhesive blends of the present invention have improved adhesion to smooth surface polyethylene films as compared to polyisobutylene-containing adhesive blends.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

What is claimed is:

1. A hot melt adhesive composition comprising:
   a poly-1-butene polymer,
   a tackifying resin, and
   from about 3 wt. % to about 16 wt. % of a hydrogenated styrene isoprene diblock copolymer having a molecular weight from 4,000 to 30,000, and a polystyrene content of 5 to 15 percent by weight, wherein isoprene blocks are at least 75 percent hydrogenated.

2. The adhesive composition of claim 1 wherein the diblock copolymer is present in an amount of about 7 wt. % to about 16 wt. %, and has a molecular weight of 6,000 to 15,000, a polystyrene content of 8 to 12 percent by weight, and the isoprene blocks are at least 85 percent hydrogenated.

3. A hot melt adhesive composition comprising:
   a poly-1-butene polymer,
   a tackifying resin, and
   from about 3 wt. % to about 25 wt. % of a hydrogenated polydiene polymer having a molecular weight of 500 to 20,000, wherein the polymer is at least 75 percent hydrogenated and has one diene block of either isoprene or butadiene or is a diblock polymer wherein one block is of isoprene and the other block is of butadiene, and wherein the polymer optionally has a terminal hydroxy group.

4. The adhesive composition of claim 3 wherein the polydiene polymer has the formula

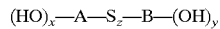

wherein A and B are polymer blocks which may be hompolymer blocks of conjugated diolefin monomers, copolymer blocks of conjugated diolefin monomers, or copolymer blocks of diolefin monomers and monoalkenyl aromatic hydrocarbon monomers, and the A blocks have a number average molecular weight of 100 to 6,000, and the B blocks have a number average molecular weight of 1,000 to 15,000, S is a vinyl aromatic hydrocarbon block which may have a number average molecular weight of from 100 to 10,000, x and y are 0 or 1, either x or y may be 1 but not both, and z is 0 or 1.

5. The adhesive composition of claim 4 wherein the polydiene polymer has the formula

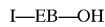

where I represents isoprene, and EB represents hydrogenated butadiene.

6. A hot melt adhesive composition consisting essentially of:
   a poly-1-butene polymer,
   a tackifying resin, and
   from about 3 wt % to about 25 wt. % of a polyisoprene homopolymer having a molecular weight of 15,000 to 40,000 wherein the homopolymer is at least 75 percent hydrogenated.

7. The adhesive composition of claim 6 wherein the polyisoprene homopolymer has a molecular weight of about 20,000 to 30,000 and is at least 85 percent hydrogenated.

* * * * *